(12) United States Patent
Chang

(10) Patent No.: US 10,215,963 B2
(45) Date of Patent: Feb. 26, 2019

(54) OPTICAL LENS

(71) Applicant: HON HAI PRECISION INDUSTRY CO., LTD., New Taipei (TW)

(72) Inventor: Tsung-Heng Chang, Tu-Cheng (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/676,920

(22) Filed: Aug. 14, 2017

(65) Prior Publication Data

US 2018/0372997 A1 Dec. 27, 2018

Related U.S. Application Data

(60) Provisional application No. 62/523,783, filed on Jun. 23, 2017.

(51) Int. Cl.
*G02B 9/62* (2006.01)
*G02B 13/00* (2006.01)
*G02B 5/20* (2006.01)

(52) U.S. Cl.
CPC ........... *G02B 13/0045* (2013.01); *G02B 9/62* (2013.01); *G02B 5/208* (2013.01)

(58) Field of Classification Search
CPC ...... G02B 9/62; G02B 13/0045; G02B 5/208; G02B 9/00
USPC ....... 359/755, 754, 733, 745, 676, 657, 658, 359/663, 708, 766
See application file for complete search history.

(56) References Cited

U.S. PATENT DOCUMENTS

2015/0370038 A1* 12/2015 Sun ........................ G02B 9/62
359/757

* cited by examiner

*Primary Examiner* — Stephone B Allen
*Assistant Examiner* — Travis Fissel
(74) *Attorney, Agent, or Firm* — ScienBiziP, P.C.

(57) ABSTRACT

An optical lens of the present disclosure assembly includes, in order from an object side to an image side, a first lens element, a second lens element, a third lens element, a fourth lens element, a fifth lens element, a sixth lens element, an optical filter and a sensor. The optical lens also has an axis. The first lens element, the second lens element, the third lens element, the fourth lens element, the fifth lens element and the sixth lens element are symmetrical about the axis.

14 Claims, 10 Drawing Sheets

OPTICAL LENS

CROSS-REFERENCE TO RELATED APPLICATIONS

This application claims the benefit under 35 U.S.C. § 119(c) of U.S. Provisional Application No. 62/523,783, filed on Jun. 23, 2017, entitled "OPTICAL LENS", the disclosure of which is incorporated by reference herein.

FIELD

The subject matter herein generally relates to a lens, especially, relates to an optical lens.

BACKGROUND

In a field of photography, a camera lens is used to acquire visible light to capture an image. In order to get a more compact optical system, the size of image sensor has became smaller. If we keep the same resolution of sensors, the pixel size should be smaller to reduce the length of optical system, so the color aberration has became more and more important to optical design. Nowadays, an optical system with compact size, low optical aberration and good tolerance endurance are needed for the optical lens.

BRIEF DESCRIPTION OF THE DRAWINGS

Implementations of the present technology will now be described, by way of example only, with reference to the attached figures.

DETAILED DESCRIPTION OF EMBODIMENTS

Figure 1:
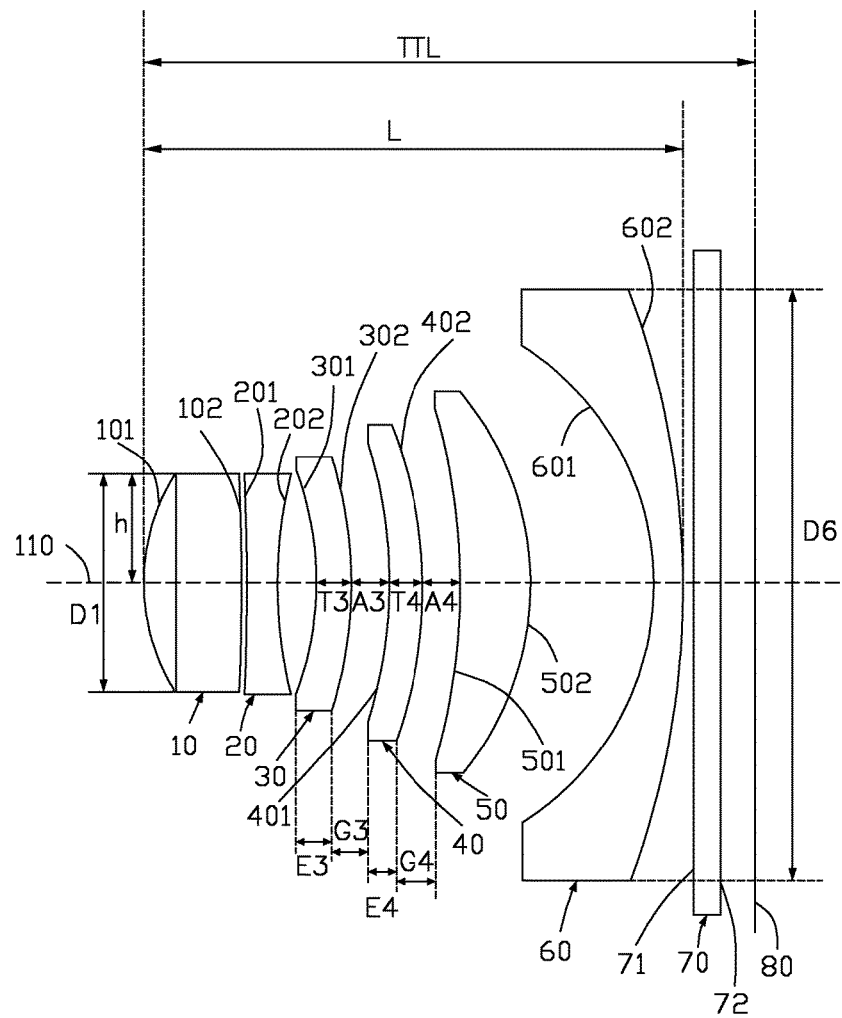
FIG. 1 is a diagrammatic, cross sectional view of a first embodiment of a optical lens of the present disclosure.

It will be appreciated that for simplicity and clarity of illustration, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure. The description is not to be considered as limiting the scope of the embodiments described herein.

Several definitions that apply throughout this disclosure will now be presented. The term "comprising" means "including, but not necessarily limited to"; it specifically indicates open-ended inclusion or membership in a so-described combination, group, series and the like. The term "coupled" is defined as connected, whether directly or indirectly through intervening components, and is not necessarily limited to physical connections. The connection can be such that the objects are permanently connected or releasably connected.

An optical lens of a first embodiment of the present disclosure assembly includes, in order from an object side to an image side, a first lens element 10, a second lens element 20, a third lens element 30, a fourth lens element 40, a fifth lens element 50, a sixth lens element 60, an optical filter 70 and an sensor 80.

The optical lens 100 also has an axis 110. The first lens element 10, the second lens element 20, the third lens element 30, the fourth lens element 40, the fifth lens element 50 and the sixth lens element 60 are symmetrical about the axis 110. A height along a direction perpendicularly to the axis 110 gradually increases from the first lens element 10 to the sixth lens element 60.

The first lens element 10 has positive power and has a first surface 101 and a second surface 102 opposite to the first surface 101. The first surface 101 is aspheric and convexes towards the object side.

The second lens element 20 has positive power. The second lens element 20 has a third surface 201 and a fourth surface 202. The fourth surface 202 is aspheric and concaves towards the first lens element 10.

The third lens element 30 has positive power. The third lens element 30 has a fifth surface 301 and a sixth surface 302. The fifth surface 301 is aspheric and concaves towards the fourth lens element 40.

The fourth lens element 40 has negative power. The fourth lens element 40 has a seventh surface 401 and a eighth surface 402. Both the seventh surface 401 and the eighth surface 402 are aspheric and concave towards the fifth lens element 50.

The fifth lens element 50 has positive power. The fifth lens element 50 has a ninth surface 501 and a tenth surface 502. Both the ninth surface 501 and the tenth surface 502 are aspheric and concave towards the sixth lens element 60.

The sixth lens element 60 has negative power. The sixth lens element 60 has a eleventh surface 601 and a twelfth surface 602. An edge of the eleventh surface 601 is flat surface. A center portion of the eleventh surface 601 is aspheric and concaves towards the optical filter 70. The twelfth surface 602 is aspheric and convexes towards the optical filter 70.

The optical filter 70 has a front surface 71 and a rear surface 72. The front surface 71 and the rear surface are flat plane. The optical filter 70 is used to filter infrared light throughout the sixth lens element 60.

The first surface 101, the second surface 102, the third surface 201, the fourth surface 202, the fifth surface 301, the sixth surface 302, the seventh surface 401, the eighth surface 402, the ninth surface 501, the tenth surface 502, the eleventh surface 601 and the twelfth surface 602 may be spherical surfaces or aspherical surfaces. In the first embodiment, the optical lens 100 satisfies the parameters of Tables 1-2. The symbols listed below are used in Tables 1 and Table 2.

R: a radius of curvature.
L1: a distance between surfaces on the axis 110.
L2: a distance between edges of surfaces.
N: a refractive index of lens element.
Vd: an Abbe number.
k: a conic constant.
h: a height from the axis 110 to the surfaces.

Wherein, T3 is center thickness of the third lens element 30, T4 is center thickness of the fourth lens element 40, A3 is center thickness of air space between the third lens element 30 and the fourth lens element 40, A4 is center thickness of air space between the fourth lens element 40 and the fifth lens element 50, E3 is edge thickness of the third lens element 30, E4 is edge thickness of fourth lens element 40,

TABLE 1

| Surface Type | Surface | | R | L1 (mm) | N | Vd | h | k | L2 |
|---|---|---|---|---|---|---|---|---|---|
| Object | | | Infinity | Infinity | | | | | |
| Standard | | Aperture | Infinity | −0.32 | | | 0.97 | | |
| Even Asphere | First surface | L1 | 1.72 | 0.86 | 1.545 | 56 | 0.98 | 0.31 | 0.53 |
| Even Asphere | Second surface | air space | 74.74 | 0.05 | | | 0.99 | 0.00 | 0.05 |
| Even Asphere | Third surface | L2 | −8.04 | 0.25 | 1.642 | 22.4 | 0.99 | 0.00 | 0.39 |
| Even Asphere | Fourth surface | air space | 8.82 | 0.37 | | | 0.99 | 66.31 | 0.05 |
| Even Asphere | Fifth surface | L3 | 15.77 | 0.24 | 1.642 | 22.4 | 1.01 | 0.00 | 0.29 |
| Even Asphere | Sixth surface | air space | 18.02 | 0.18 | | | 1.16 | 0.00 | 0.17 |
| Even Asphere | Seventh surface | L4 | −4.22 | 0.29 | 1.545 | 56 | 1.31 | −20.07 | 0.21 |
| Even Asphere | Eighth surface | air space | −13.29 | 0.22 | | | 1.45 | 0.00 | 0.27 |
| Even Asphere | Ninth surface | L5 | 7.37 | 0.59 | 1.545 | 56 | 1.62 | 0.00 | 0.20 |
| Even Asphere | Tenth surface | air space | −2.67 | 1.23 | | | 1.76 | −9.25 | 0.73 |
| Even Asphere | Eleventh surface | L6 | −2.33 | 0.25 | 1.545 | 56 | 2.23 | −0.12 | 0.89 |
| Even Asphere | Twelfth surface | air space | 5.57 | 0.10 | | | 2.73 | −31.97 | 0.55 |
| Standard | Front surface | IRCF | Infinity | 0.21 | 1.523 | 54.5 | 3.04 | | 0.21 |
| Standard | Rear surface | air space | Infinity | 0.30 | | | 3.11 | | 0.30 |
| IMA | | | Infinity | — | | | 3.26 | | 0.00 |

TABLE 2

| | | Aspheric coefficient | | | | | | | |
|---|---|---|---|---|---|---|---|---|---|
| | | A2 | A4 | A6 | A8 | A10 | A12 | A14 | A16 |
| First lens element | First surface | 0 | −0.01077 | 0.015734 | −0.04136 | 0.03907 | −0.01847 | 0.000525 | 0 |
| | Second surface | 0 | −0.05986 | 0.002986 | 0.205841 | −0.26965 | 0.050302 | 0.034055 | 0 |
| Second lens element | Third surface | 0 | −0.03867 | 0.158834 | −0.1019 | 0.092224 | −0.16812 | 0.092158 | 0 |
| | Fourth surface | 0 | −0.01414 | 0.148197 | −0.21054 | 0.176243 | −0.077 | 0.006856 | 0 |
| Third lens element | Fifth surface | 0 | −0.1909 | −0.08639 | 0.074515 | −0.08001 | 0.05573 | −0.0133 | 0 |
| | Sixth surface | 0 | −0.12202 | −0.05177 | −0.01077 | 0.111982 | −0.11005 | 0.04167 | 0 |
| Fourth lens element | Seventh surface | 0 | −0.02027 | 0.036964 | −0.01316 | −0.00622 | −0.00234 | 0.002387 | 0 |
| | Eighth surface | 0 | −0.0973 | 0.075193 | −0.01927 | −0.00665 | 0.001887 | 0.000165 | 0 |
| Fifth lens element | Ninth surface | 0 | −0.07412 | 0.026871 | −0.01282 | 0.001631 | 0.000158 | −1.9E−05 | 0 |
| | Tenth surface | 0 | −0.033 | 0.004321 | 0.005153 | −0.00668 | 0.002421 | −0.00028 | 0 |
| Sixth lens element | Eleventh surface | 0 | −0.03604 | 0.018248 | −0.00255 | −7.6E−05 | 8.3E−05 | −5.9E−06 | 0 |
| | Twelfth surface | 0 | −0.03612 | 0.01136 | −0.00295 | 0.000474 | −4.6E−05 | 2.02E−06 | 0 |

The even aspherical surface are shaped according to the formula:

$$Z = \frac{ch^2}{1+\sqrt{1-(k+1)c^2h^2}} + \sum A_i h^i \quad (1)$$

Wherein Z is a displacement of the z-component from the aspherical surface to a vertex of the aspherical surface, h is a height from the optical axis 110 of the optical lens 100 to the aspherical surface, c is a radius of curvature, k is a conic constant, and Ai are in-th order correction coefficients of the aspherical surfaces.

The optical lens 100 satisfies the formulas:

$$0.82 < T3/T4 < 0.9 \quad (2)$$

$$0.84 < A3/A4 < 0.92 \quad (3)$$

$$1.33 < E3/E4 < 1.55 \quad (4)$$

$$0.59 < G3/G4 < 0.68 \quad (5)$$

$$0.3 < Vd3/Vd4 < 0.5 \quad (6)$$

G3 is edge thickness of air space between third lens element 30 and the fourth lens element 40, G4 is edge thickness of air space between lens element 40 and the fifth lens element 50, vd3 is the abbe number of the third lens element 30, vd4 is the abbe number of the fourth lens element 40. The color aberration of the optical lens 100 are reduced and the image quality for small-pixel-size sensor is improved by following the formula (2)-(6).

The optical lens 100 further satisfies the formulas:

$$-1.24 < f3/(f4*f5^2) < -1.05 \quad (7)$$

Wherein, f3 is the focal length of the third lens element 30, f4 is the focal length of the fourth lens element 40, f5 is the focal length of the fifth lens element 50. The formulas (7) is used to balance the optical power of the lens element and improve the tolerance sensitivity of the optical lens 100.

The optical lens 100 further satisfies the formulas:

$$0.18 < (T3+T4+A3+A4)/TTL < 0.24 \quad (8)$$

Wherein TTL is a distance between the first surface 101 of the first lens element 10 and the sensor 80. The formulas (8) is used to ensure that there are enough space for other lens elements to correct other aberrations.

The optical lens 100 further satisfies the formulas:

$$0.6 < D6/D1/EFL < 0.73 \quad (9)$$

Wherein D1 is clear aperture diameter of the first lens element 10, D6 is clear aperture diameter of the sixth lens element 60, EFL is the effective focal length of the optical lens 100. The formulas (9) is used to control the ratio of focal length and lens element diameter to keep the compact size of the optical lens 100.

The optical lens 100 further satisfies the formulas:

$$0.43 < L/D6/R1 < 0.52 \quad (10)$$

Wherein L is a distance from the first surface 101 of the first lens element 10 to the twelfth surface 602 of the sixth lens element 60, R1 is radius of curvature of the first surface 101. The formulas (10) is used to control the radio of lens element and radius of curvature to keep the compact size of the optical lens 100.

According to an example of the optical lens 100 of the first embodiment, wherein T3/T4=0.849, A3/A4=0.849, E3/E4=1.346, G3/G4=0.633, Vd3/Vd4=0.400, f3/(f4*f5^2)=−1.211, (T3+T4+A3+A4)/TTL=0.181, D6/D1/EFL=0.647, L/D6/R1=0.480.

Figure 2:
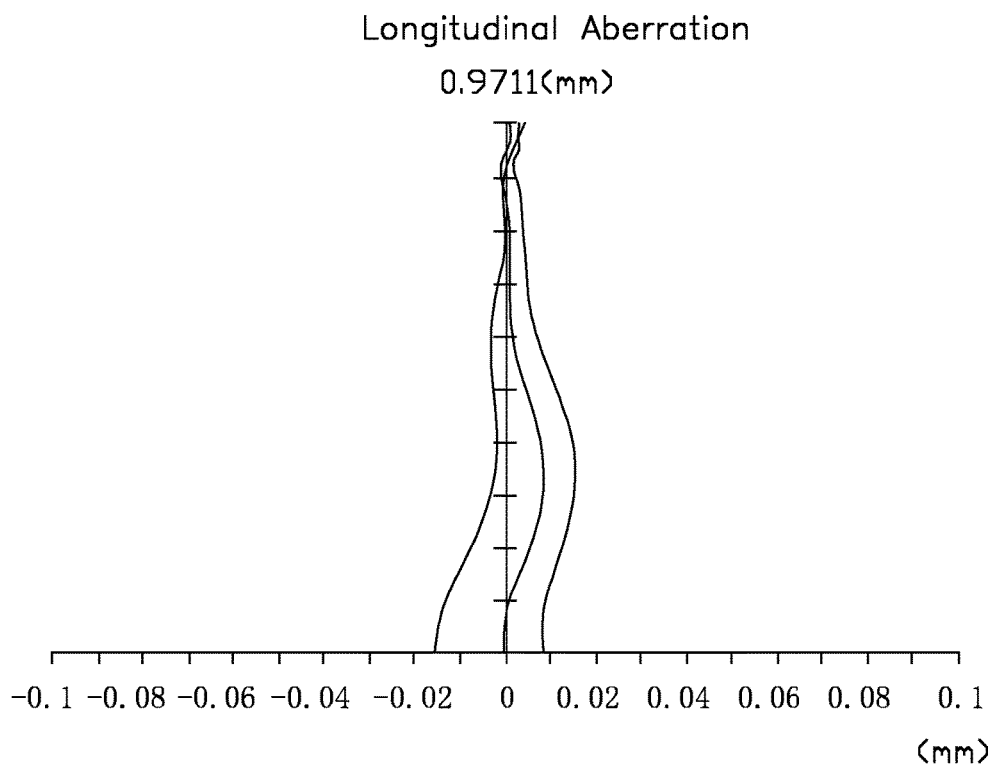
FIG. 2 is a graph showing longitudinal spherical aberration of the first embodiment of the optical lens of the present disclosure.
Figure 3:
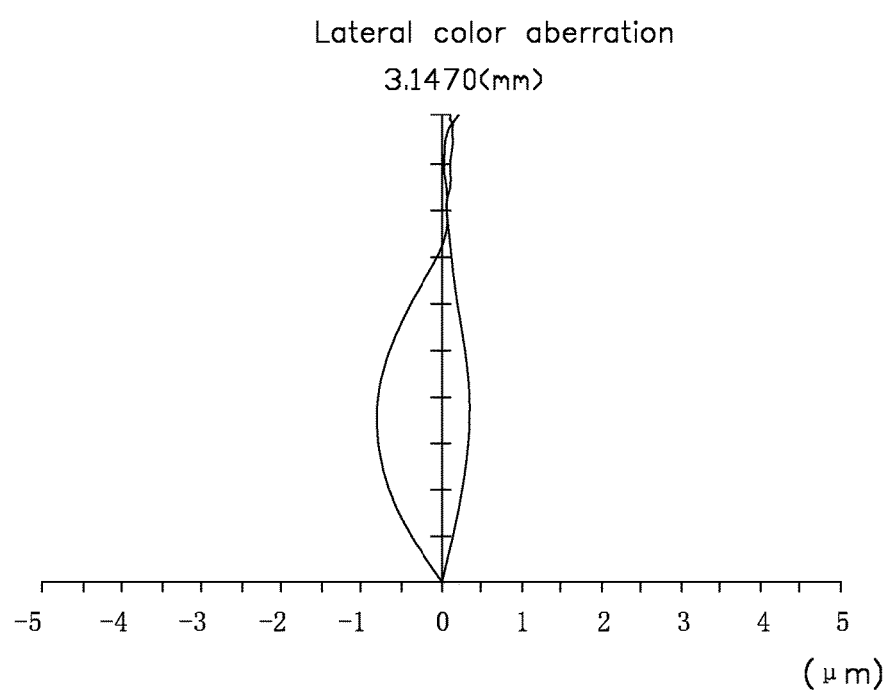
FIG. 3 is a graph showing lateral color aberration of the first embodiment of the optical lens of the present disclosure.
Figure 4:
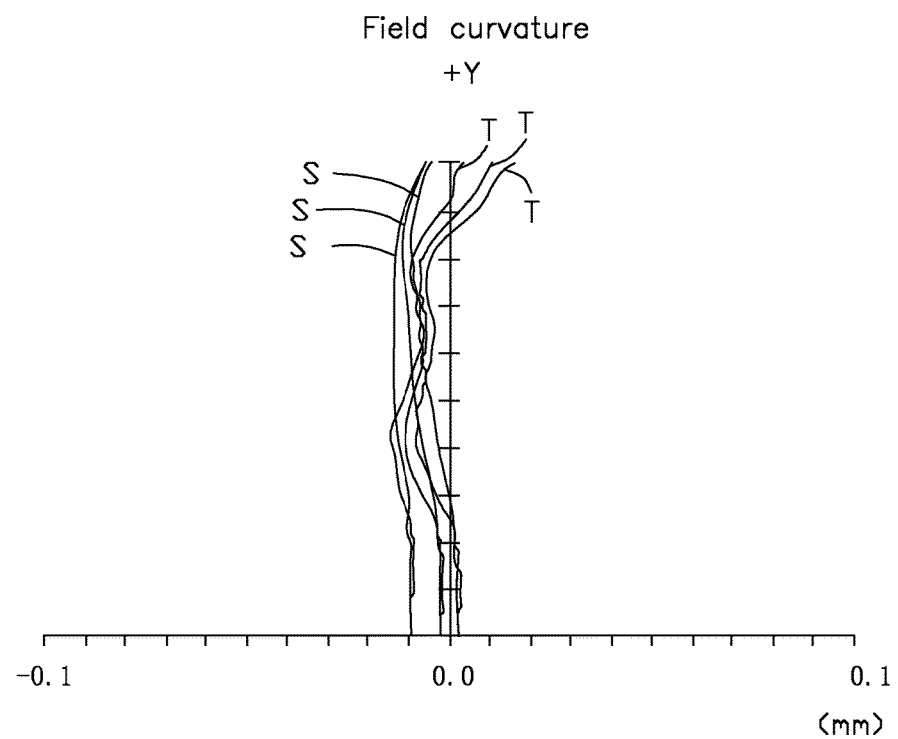
FIG. 4 is a graph showing field curvature of the first embodiment of the optical lens of the present disclosure.

In the first embodiment, the longitudinal spherical aberration graph, the lateral color aberration graph, the field curvature graph, the distortion graph of the optical lens 100 are respectively shown in FIGS. 2-5. The longitudinal spherical aberration of visible light (with a wavelength between 400-700 nm) shown in FIG. 2 is within a range of −0.02 mm to 0.02 mm. The lateral color aberration shown in FIG. 3 is kept in −1 μm to 1 μm. The sagittal field curvature and the tangential field curvature shown in FIG. 4 are kept in −0.05 mm to 0.05 mm. The distortion in FIG. 5 falls within a range of 0% to 3%. In the embodiment, the spherical aberration, field curvature, and distortion are well controlled in the optical lens 100.

Figure 5:
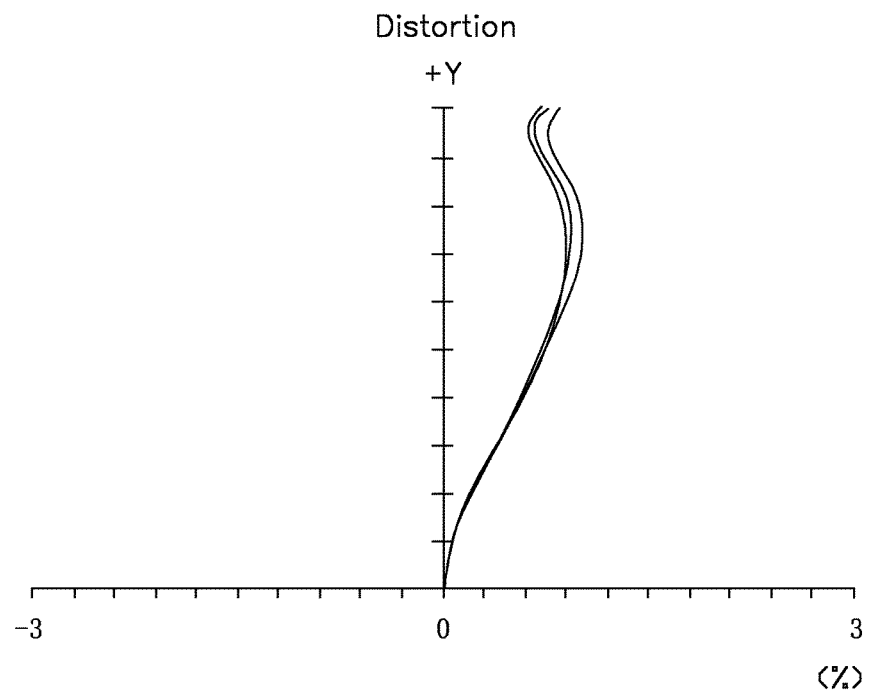
FIG. 5 is a graph showing distortion of the first embodiment of the optical lens of the present disclosure.
Figure 6:
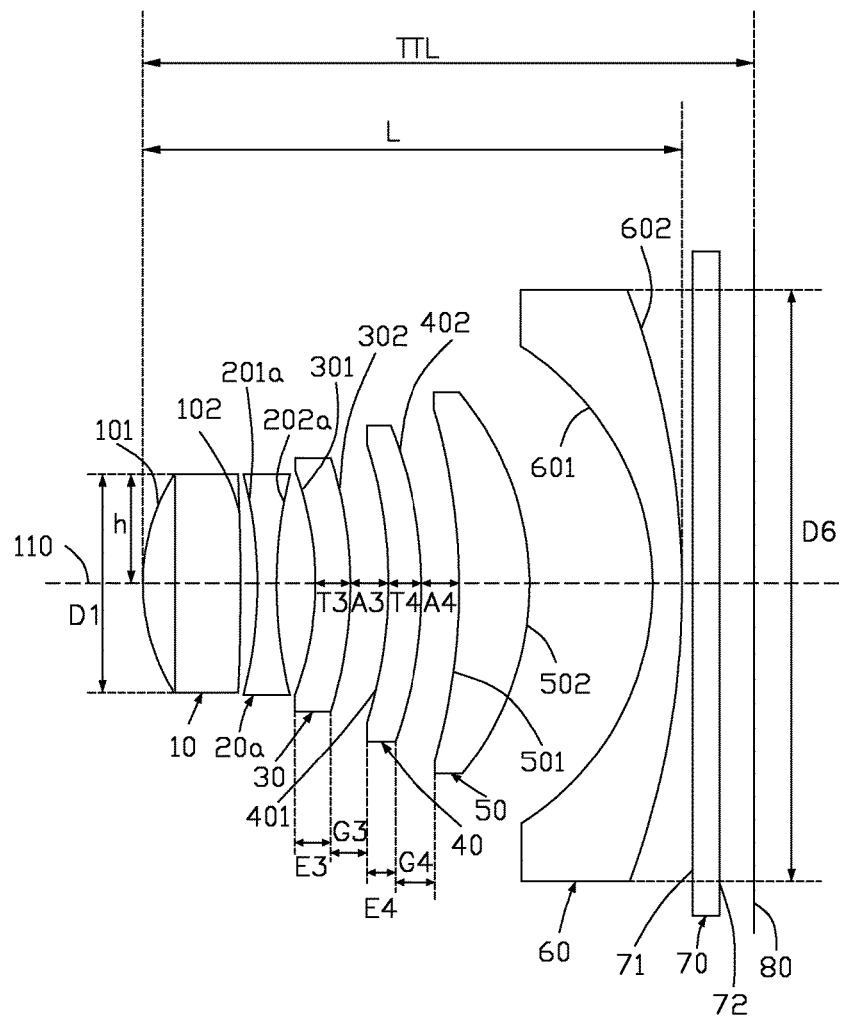
FIG. 6 is a diagrammatic, cross sectional view of a second embodiment of a optical lens of the present disclosure.

A second embodiment of an optical lens 100a is shown in FIG. 5. The optical lens 100 is similar to the optical lens 100 of he first embodiment of the present disclosure. The difference there between are that the second lens element 20a has negative power. The second lens element 20a has a third surface 201a and a fourth surface 202a. The third surface 201a is aspheric and concaves towards the third lens element 30. The fourth surface 202a is aspheric and concaves towards the first lens element 10.

In the second embodiment, the optical lens 100 satisfies the parameters of Tables 3-4 and the even aspherical surfaces of Tables 3-4 are shaped according to the formula (1). Listed below are the symbols used in Tables 3-4.

R: a radius of curvature.
L1: a distance between surfaces on the axis 110.
L2: a distance between edges of surfaces.
N: a refractive index of lens element.
Vd: an Abbe number.
k: a conic constant.
h: a height from the axis 110 to the surfaces.

TABLE 3

| Surface. Type | Surface | | R | L1 (mm) | N | Vd | h | k | L2 |
|---|---|---|---|---|---|---|---|---|---|
| Object | | | Infinity | Infinity | | | | | |
| Standard | | Aperture | Infinity | −0.29 | | | 0.92 | | |
| Even Asphere | First surface | L1 | 1.73 | 0.48 | 1.545 | 56 | 0.94 | 0.25 | 0.21 |
| Even Asphere | Second surface | air space | 26.57 | 0.21 | | | 0.92 | 0.00 | 0.13 |
| Even Asphere | Third surface | L2 | −3.52 | 0.24 | 1.642 | 22.4 | 0.93 | 0.00 | 0.33 |
| Even Asphere | Fourth surface | air space | −50.46 | 0.22 | | | 0.96 | 0.00 | 0.04 |
| Even Asphere | Fifth surface | L3 | 8.51 | 0.30 | 1.642 | 22.4 | 0.97 | −36.37 | 0.36 |
| Even Asphere | Sixth surface | air space | 8.52 | 0.24 | | | 1.14 | −134.88 | 0.25 |
| Even Asphere | Seventh surface | L4 | −940.69 | 0.36 | 1.545 | 56 | 1.28 | 0.00 | 0.23 |
| Even Asphere | Eighth surface | air space | 30.78 | 0.27 | | | 1.37 | 0.00 | 0.41 |
| Even Asphere | Ninth surface | L5 | 42.00 | 0.47 | 1.545 | 56 | 1.63 | 0.00 | 0.23 |
| Even Asphere | Tenth surface | air space | −2.05 | 1.21 | | | 1.73 | −7.66 | 0.63 |
| Even Asphere | Eleventh surface | L6 | −2.81 | 0.31 | 1.538 | 45.3 | 2.11 | 0.45 | 0.85 |
| Even Asphere | Twelfth surface | air space | 3.91 | 0.21 | | | 2.67 | −1.94 | 0.57 |
| Standard | Front surface | IRCF | Infinity | 0.21 | 1.523 | 54.5 | 2.95 | | 0.21 |
| Standard | Rear surface | air space | Infinity | 0.30 | | | 3.01 | | 0.30 |
| IMA | | | Infinity | — | | | 3.15 | | 0.00 |

TABLE 4

| | Aspheric coefficient | A2 | A4 | A6 | A8 | A10 | A12 | A14 | A16 |
|---|---|---|---|---|---|---|---|---|---|
| First lens element | First surface | 0 | −0.01253 | 0.04885 | −0.08564 | 0.0468 | 0.030216 | −0.03913 | 0 |
| | Second surface | 0 | −0.00779 | −0.02253 | 0.110388 | −0.215289 | 0.187559 | −0.07432 | 0 |
| Second lens element | Third surface | 0 | 0.053718 | 0.046269 | −0.05451 | 0.083155 | −0.12897 | 0.076464 | 0 |
| | Fourth surface | 0 | −0.01896 | 0.175399 | −0.27214 | 0.288379 | −0.2004 | 0.053649 | 0 |
| Third lens element | Fifth surface | 0 | −0.19331 | −0.02891 | 0.062098 | −0.13904 | 0.118691 | −0.07123 | 0 |
| | Sixth surface | 0 | −0.07879 | −0.02803 | −0.03921 | 0.124119 | −0.11523 | 0.038534 | 0 |
| Fourth lens element | Seventh surface | 0 | −0.05201 | 0.012468 | −0.00221 | −0.00575 | 0.003763 | −0.00011 | 0 |
| | Eighth surface | 0 | −0.11639 | 0.03249 | −0.01634 | 9.34E−05 | 0.003017 | 0.000129 | 0 |
| Fifth lens element | Ninth surface | 0 | −0.04416 | 0.030924 | −0.01427 | 0.002547 | 0.000259 | −0.0001 | 0 |
| | Tenth surface | 0 | −0.05967 | 0.051289 | −0.00012 | −0.0083 | 0.002542 | −0.00026 | 0 |
| Sixth lens element | Eleventh surface | 0 | −0.03354 | 0.011622 | 0.000147 | −0.00016 | −1.5E−06 | 1.79E−06 | 0 |
| | Twelfth surface | 0 | −0.0564 | 0.014904 | −0.00348 | 0.000533 | −4.6E−05 | 1.57E−06 | 0 |

The optical lens 100a further satisfies the formulas:

$$0.82 < T3/T4 < 0.9 \quad (2)$$

$$0.84 < A3/A4 < 0.92 \quad (3)$$

$$1.33 < E3/E4 < 1.55 \quad (4)$$

$$0.59 < G3/G4 < 0.68 \quad (5)$$

$$0.3 < Vd3/Vd4 < 0.5 \quad (6)$$

$$-1.24 < f3/(f4*f5^2) < -1.05 \quad (7)$$

$$0.18 < (T3+T4+A3+A4)/TTL < 0.24 \quad (8)$$

$$0.6 < D6/D1/EFL < 0.73 \quad (9)$$

$$0.43 < L/D6/R1 < 0.52 \quad (10)$$

Wherein T3 is center thickness of the third lens element 30, T4 is center thickness of the fourth lens element 40, A3 is center thickness of air space between the third lens element 30 and the fourth lens element 40, A4 is center thickness of air space between the fourth lens element 40 and the fifth lens element 50, E3 is edge thickness of the third lens element 30, E4 is edge thickness of fourth lens element 40, G3 is edge thickness of air space between third lens element 30 and the fourth lens element 40, G4 is edge thickness of air space between lens element 40 and the fifth lens element 50, vd3 is the abbe number of the third lens element 30, vd4 is the abbe number of the fourth lens element 40, f3 is the focal length of the third lens element 30, f4 is the focal length of the fourth lens element 40, f5 is the focal length of the fifth lens element 50, TTL is a distance between the first surface 101 of the first lens element 10 and the sensor 80, D1 is clear aperture diameter of the first lens element 10, D6 is clear aperture diameter of the sixth lens element 60, EFL is the effective focal length of the optical lens 100, L is a distance from the first surface 101 of the first lens element 10 to the twelfth surface 602 of the sixth lens element 60, R1 is radius of curvature of the first surface 101.

According to an example of the optical lens 100a of the second embodiment, wherein T3/T4=0.847, A3/A4=0.901, E3/E4=1.535, G3/G4=0.601, Vd3/Vd4=0.400, f3/(f4*f5^2)=−1220, (T3+T4+A3+A4)/TTL=0.232, D6/D1/EFL=0.716, L/D6/R1=0.467.

Figure 7:
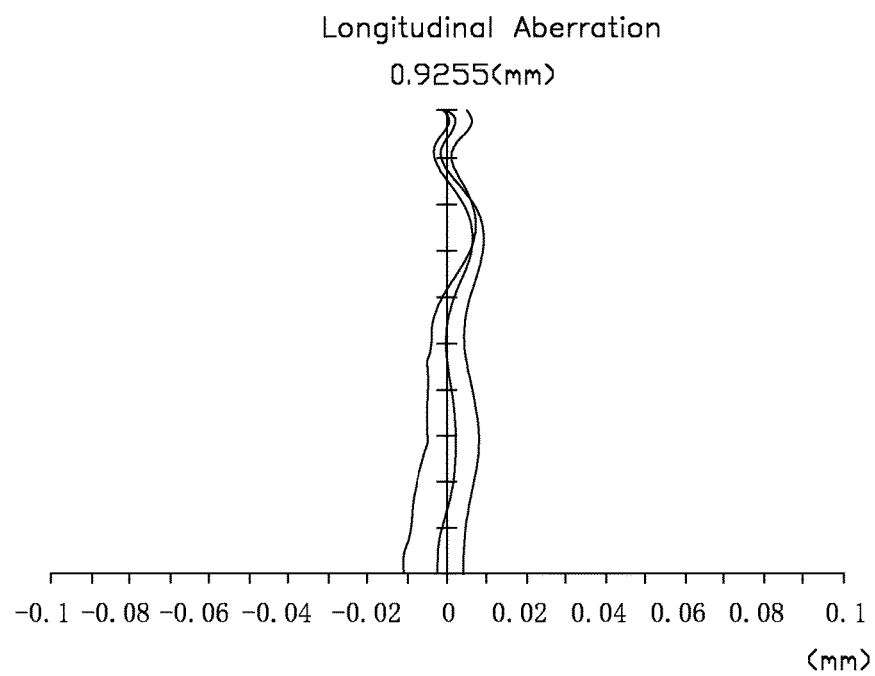
FIG. 7 is a graph showing longitudinal spherical aberration of the first embodiment of the optical lens of the present disclosure.
Figure 8:
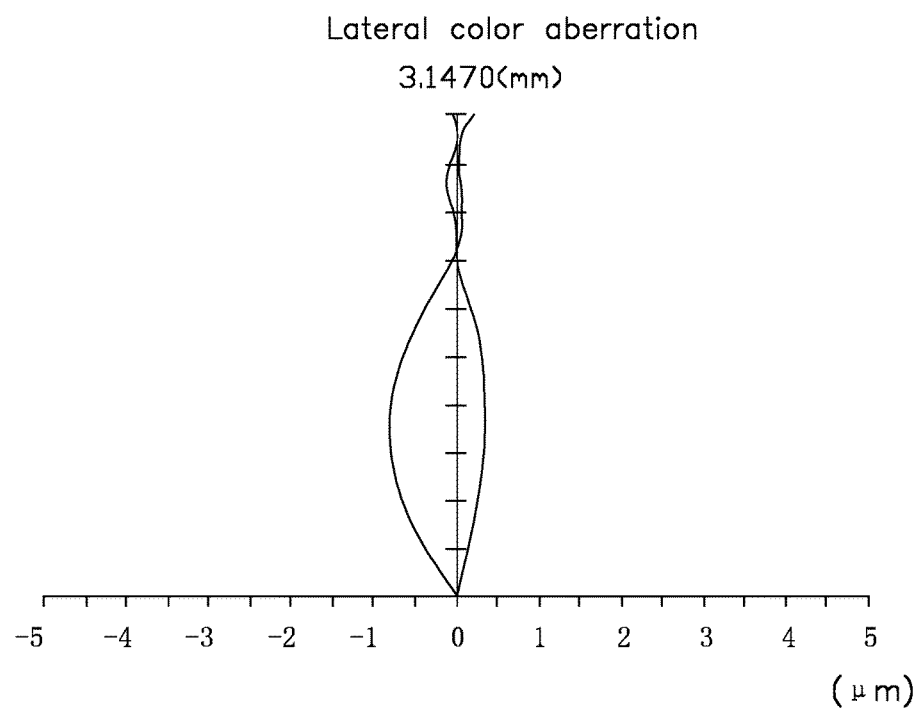
FIG. 8 is a graph showing lateral color aberration of the second embodiment of the optical lens of the present disclosure.
Figure 9:
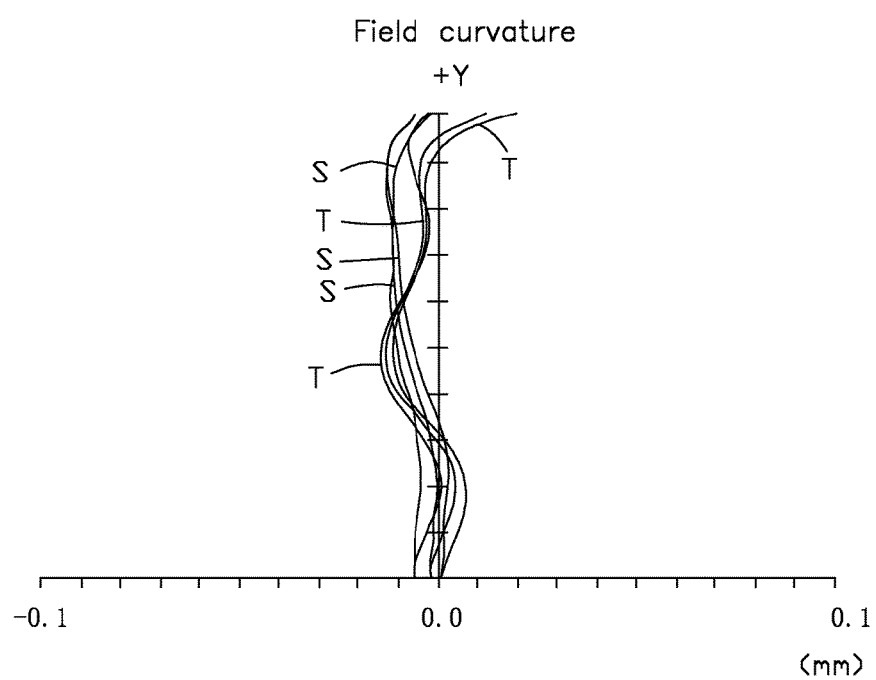
FIG. 9 is a graph showing field curvature of the second embodiment of the optical lens of the present disclosure.
Figure 10:
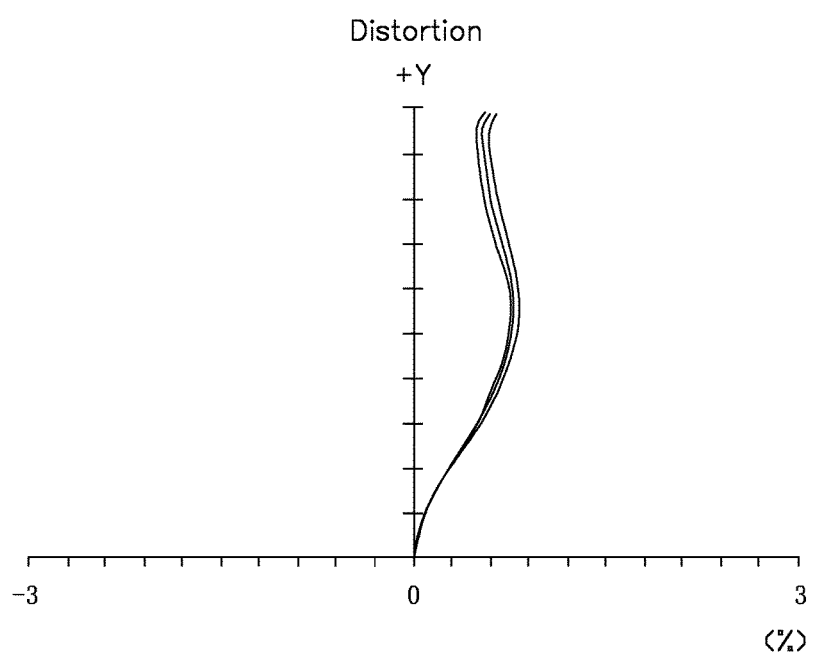
FIG. 10 is a graph showing distortion of the first embodiment of the optical lens of the present disclosure.

In the second embodiment, the longitudinal spherical aberration graph, the lateral color aberration graph, the field curvature graph, the distortion graph of the optical lens 100a are respectively shown in FIGS. 7-10. The longitudinal spherical aberration of visible light (with a wavelength between 400-700 nm) shown in FIG. 7 is within a range of −0.02 mm to 0.01 mm. The lateral color aberration shown in FIG. 8 is kept in −1 μm to 1 μm. The sagittal field curvature and the tangential field curvature shown in FIG. 9 are kept in −0.03 mm to 0.05 mm. The distortion in FIG. 10 falls within a range of 0% to 3%. Obviously, the spherical aberration, field curvature, and distortion are well controlled in the optical lens 100a.

The embodiments shown and described above are only examples. Many details are often found in the art such as the other features of an optical lens. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, including in matters of shape, size and arrangement of the parts within the principles of the present disclosure up to, and including the full extent established by the broad general meaning of the terms used in the claims. It will therefore be appreciated that the embodiments described above can be modified within the scope of the claims.

What is claimed is:

1. An optical lens having an axis, the optical lens comprising:
a first lens element having positive power and having a first surface and a second surface opposite to the first surface;
a second lens element having a third surface and a fourth surface;
a third lens element having a positive power and having a fifth surface and a sixth surface;
a fourth lens element having negative power and having a seventh surface and a eighth surface;
a fifth lens element having positive power and having a ninth surface and a tenth surface;
a sixth lens element having negative power and having a eleventh surface and a twelfth surface; and
an sensor;
wherein the optical lens satisfies the following formulas:

$$0.82 < T3/T4 < 0.9;$$

$$0.84 < A3/A4 < 0.92;$$

$$1.33 < E3/E4 < 1.55;$$

$$0.59 < G3/G4 < 0.68;$$

$$0.3 < Vd3/Vd4 < 0.5;$$

Wherein, T3 is center thickness of the third lens element, T4 is center thickness of the fourth lens element, A3 is center thickness of air space between the third lens element and the fourth lens element, A4 is center thickness of air space between the fourth lens element and the fifth lens element, E3 is edge thickness of the third lens element, E4 is edge thickness of fourth lens element, G3 is edge thickness of air space between third lens element 30 and the fourth lens element, G4 is edge thickness of air space between lens element 40 and the fifth lens element, vd3 is the abbe number of the third lens element, vd4 is the abbe number of the fourth lens element.

2. The optical lens of claim 1, wherein the first lens element, the second lens element, the third lens element, a fourth lens element, the fifth lens element, a sixth lens element and the sensor are assembled in order from an object side to an image side.

3. The optical lens of claim 2, wherein the optical lens also comprises an optical filter, the optical filter mounts between the sixth lens element and the sensor, the optical filter is also spaced from the sixth element and the sensor.

4. The optical lens of claim 3, wherein the optical filter has a front surface and a rear surface, the front surface and the rear surface are flat plane.

5. The optical lens of claim 2, wherein the first surface is aspheric and convexes towards the object side, the fifth surface is aspheric and concaves towards the fourth lens element, both the seventh surface and the eighth surface are aspheric and concave towards the fifth lens element, both the ninth surface and the tenth surface are aspheric and concave towards the sixth lens element.

6. The optical lens of claim 3, wherein a center portion of the eleventh surface is aspheric and concaves towards the optical filter, the twelfth surface is aspheric and convexes towards the optical filter.

7. The optical lens of claim 2, wherein the second lens element has positive power, the fourth surface is aspheric and concaves towards the first lens element.

8. The optical lens of claim 2, wherein the second lens element has negative power, the third surface is aspheric and concaves towards the third lens element, the fourth surface is aspheric and concaves towards the first lens element.

9. The optical lens of claim 5, wherein the optical lens further satisfies the formulas: $-1.24 < f3/(f4*f5^2) < -1.05$, wherein, f3 is the focal length of the third lens element, f4 is the focal length of the fourth lens element, f5 is the focal length of the fifth lens element.

10. The optical lens of claim 5, wherein the optical lens further satisfies the formulas: $0.18 < (T3+T4+A3+A4)/TTL < 0.24$, wherein TTL is a distance between the first surface of the first lens element and the sensor.

11. The optical lens of claim 5, wherein the optical lens further satisfies the formulas: $0.6 < D6/D1/EFL < 0.73$, wherein D1 is clear aperture diameter of the first lens element, D6 is clear aperture diameter of the sixth lens element, EFL is the effective focal length of the optical lens.

12. The optical lens of claim 11, wherein the optical lens further satisfies the formulas: $0.43 < L/D6/R1 < 0.52$, wherein L is a distance from the first surface of the first lens element to the twelfth surface of the sixth lens element, R1 is radius of curvature of the first surface.

13. The optical lens of claim 2, wherein the first lens element, the second lens element, the third lens element, the fourth lens element, the fifth lens element and the sixth lens element are symmetrical about the axis.

14. The optical lens of claim 2, wherein a height of the first lens element, a height of the second lens element, a height of the third lens element, a height of the fourth lens element, a height of the fifth lens element and a height of the sixth lens element along a direction perpendicularly to the axis 110 are increased.

* * * * *